US012265629B2

(12) United States Patent
Darwatkar et al.

(10) Patent No.: US 12,265,629 B2
(45) Date of Patent: Apr. 1, 2025

(54) SUPPRESSING A VULNERABILITY OF A CONTINUOUS INTEGRATION PIPELINE WITH AUDIT FUNCTIONALITY

(71) Applicant: RED HAT, INC., Raleigh, NC (US)

(72) Inventors: Mandar Darwatkar, Mountain View, CA (US); Nakul Chander, Redwood City, CA (US); Saif Chaudhry, Palo Alto, CA (US); Alan Roy, Sunnyvale, CA (US); James Scott, Santa Clara, CA (US); Mansur Syed, Bloomington, CA (US)

(73) Assignee: Red Hat, Inc., Charlotte, NC (US)

( * ) Notice: Subject to any disclaimer, the term of this patent is extended or adjusted under 35 U.S.C. 154(b) by 298 days.

(21) Appl. No.: 18/081,803

(22) Filed: Dec. 15, 2022

(65) Prior Publication Data

US 2024/0202343 A1      Jun. 20, 2024

(51) Int. Cl.
    G06F 21/57      (2013.01)
(52) U.S. Cl.
    CPC ...... *G06F 21/577* (2013.01); *G06F 2221/034* (2013.01)
(58) Field of Classification Search
    CPC .................. G06F 21/577; G06F 2221/034
    See application file for complete search history.

(56) References Cited

U.S. PATENT DOCUMENTS

| 7,926,113 | B1* | 4/2011 | Gula | H04L 63/1425 |
| | | | | 726/25 |
| 8,230,497 | B2* | 7/2012 | Norman | H04L 63/1433 |
| | | | | 709/229 |
| 8,839,442 | B2* | 9/2014 | Deraison | G06F 21/577 |
| | | | | 726/25 |
| 9,253,202 | B2* | 2/2016 | Thakur | H04L 63/1433 |
| 11,057,418 | B2* | 7/2021 | Ocepek | H04L 63/1433 |
| 11,089,042 | B2* | 8/2021 | Ward | H04L 63/20 |
| 11,310,262 | B1* | 4/2022 | Oliphant | H04L 63/1416 |
| 11,727,117 | B2* | 8/2023 | Shah | G06F 8/71 |
| | | | | 726/25 |

(Continued)

OTHER PUBLICATIONS

Cheirdari et al., "Analyzing False Positive Source Code Vulnerabilities Using Static Analysis Tools", https://ieeexplore.ieee.org/abstract/document/8622456, 2018; pp. 4782-4788.

*Primary Examiner* — J. Brant Murphy
(74) *Attorney, Agent, or Firm* — Kilpatrick Townsend & Stockton LLP (57) ABSTRACT

A vulnerability with respect to an image file in a continuous integration (CI) pipeline can be suppressed according to some aspects described herein. For example, a processor can receive an alert for the vulnerability with the CI pipeline being able to block deployment of the image file in response to the alert. Based on the alert, the processor can determine that the vulnerability of the image file is deferrable. After determining that the vulnerability is deferrable, the processor can automatically adjust a status of the vulnerability from an observed state to a deferred state. The CI pipeline can allow the deployment of the image file based on the status of the vulnerability being in the deferred state. The processor can deploy the image file in the CI pipeline after adjusting the status of the vulnerability to the deferred state.

20 Claims, 3 Drawing Sheets

(56) References Cited

U.S. PATENT DOCUMENTS

| | | | |
|---|---|---|---|
| 2004/0006704 A1* | 1/2004 | Dahlstrom | G06F 21/577 |
| | | | 726/25 |
| 2014/0331326 A1* | 11/2014 | Thakur | H04L 63/1433 |
| | | | 726/25 |
| 2017/0034023 A1* | 2/2017 | Nickolov | H04L 43/0817 |
| 2017/0039520 A1* | 2/2017 | Trump | G06Q 10/103 |
| 2020/0202006 A1* | 6/2020 | Shah | G06F 8/77 |
| 2020/0387441 A1* | 12/2020 | Bregman | G06F 11/076 |
| 2021/0090694 A1* | 3/2021 | Colley | G16B 30/00 |
| 2021/0144168 A1* | 5/2021 | Vester | G06F 9/451 |
| 2021/0200834 A1* | 7/2021 | Adams | G06F 16/972 |
| 2021/0250371 A1 | 8/2021 | Ocepek et al. | |
| 2022/0060453 A1* | 2/2022 | Crabtree | H04L 63/08 |
| 2024/0281544 A1* | 8/2024 | Dumitrascu | G06F 3/0652 |

* cited by examiner

SUPPRESSING A VULNERABILITY OF A CONTINUOUS INTEGRATION PIPELINE WITH AUDIT FUNCTIONALITY

TECHNICAL FIELD

The present disclosure relates generally to continuous integration during software development. More specifically, but not by way of limitation, this disclosure relates to suppressing a vulnerability of a continuous integration pipeline with audit functionality.

BACKGROUND

Continuous integration is the process of merging developers' working copies of source code into a shared mainline code-base at frequent intervals, such as multiple times a day. Continuous integration can be implemented using continuous integration tools, such as Jenkins, Buildbot, or Travis CI. Developers can submit source code at periodic intervals to the continuous integration tool, which can implement a continuous integration pipeline that attempts to produce a build from the source code. A build is executable code that has been successfully created and tested for a piece of software, such as a software application. Generally, the continuous integration pipeline includes multiple phases that are executed in a sequential order. The continuous integration pipeline can begin with a compilation phase in which the source code is compiled into artifacts. Artifacts are executable code that has been compiled from source code for testing. The continuous integration pipeline can then perform a testing phase in which various types of tests (e.g., integration tests, acceptance tests, and unit tests) are executed on the artifacts. The testing phase can enable the developers to rapidly detect defects in the source code, so that they can be corrected as soon as possible.

DETAILED DESCRIPTION

A continuous integration pipeline can include building or deploying an image file for a container. The image file can be used to support a target software program that is deployed by the container. In some examples, a vulnerability with the image file can be identified by a security platform. The security platform can communicate the vulnerability to developers of the image file, users of the image file, or a combination thereof. Examples of the vulnerability can include bugs, exploits, unpatched program code, or a combination thereof. The vulnerability can be communicated to the developers as an alert, such as a Common Vulnerability and Exposure (CVE) alert, a policy violation, or another suitable type of alert. The developers can patch the vulnerability by building an updated version of the image file. But building the updated version can require a large amount of time, such as months. Additionally, while the vulnerability is observed in the CI pipeline, the developers can be blocked from building on or from deploying the image file prior to patching the vulnerability. Furthermore, the vulnerability being observed can increase a risk score calculated for the image file, the container, or a combination thereof.

Some examples of the present disclosure can overcome one or more of the issues mentioned above by suppressing the vulnerability through deferring the vulnerability or through marking the vulnerability as false positive. When the vulnerability is suppressed, the developers can build on or deploy the image file prior to or without addressing the vulnerability. By deferring the vulnerability, a status of the vulnerability is adjusted from an observed state, which prevents the image file from being deployed, to a deferred state. Similarly, by marking the vulnerability as false positive, the status of the vulnerability is adjusted from the observed state to a false positive state. The false positive state can indicate that the vulnerability has a relatively low likelihood of being a threat to deploying the image file. Additionally, while the vulnerability is suppressed, a weight for the vulnerability can be adjusted for an evaluation of the image file, the container, or a combination thereof. The weight can be associated with a severity of the vulnerability with respect to deploying the image file. The evaluation can include determining a risk calculation, generating a report, or other suitable assessment that includes the vulnerability.

In one particular example, a computing system can determine that the vulnerability is deferrable by using the alert associated with the vulnerability. The vulnerability may be deferrable because a solution (e.g., a patch or a software update) to address the vulnerability is unavailable. For example, a hardware limitation, such as available RAM in the computing system being below a predefined threshold, can be considered a deferrable vulnerability. The hardware limitation may increase security risk for a corresponding image file or the computing system but can be addressed at a later time by adding servers or other suitable computing components. Alternatively, the computing system can determine that the vulnerability is a false positive, indicating that the vulnerability is falsely reported. For example, a known software problem in the image file that has minimal security risk with respect to the computing system can be marked as a false positive. Deferring the vulnerability or marking the vulnerability as a false positive can remove the vulnerability from being included in the evaluation of the image file, the container, or CI pipeline. As a result, developers can focus on applying remediation for the fixable problems, thereby allocating limited computing resources more efficiently.

Deploying the image file can occur once vulnerabilities in the observed state are undetectable for the image file. For example, a vulnerability detector can be communicatively coupled to the computing system and can detect observed vulnerabilities in the computing system. If the vulnerability detector does not detect the observed vulnerabilities in a specific image file that is ready for deployment, the computing system can automatically deploy the specific image file. The vulnerability detector may not detect the observed vulnerabilities due to the computing system suppressing at least one observed vulnerability of the observed vulnerabilities. For example, a subset of the observed vulnerabilities can be marked as false positives, enabling the computing system to automatically deploy image files containing the subset of the observed vulnerabilities.

In examples where the vulnerability is deferrable because the solution is unavailable, the vulnerability can be suppressed for a predetermined amount of time. For example, a vulnerability associated with the hardware limitation may be deferred until a corresponding computing component is available to address the hardware limitation. After the predetermined amount of time has been exceeded, the status of the vulnerability can be adjusted back from the deferred state to the observed state. The computing system may automatically approve an extension for the predetermined amount of time such that the status of the vulnerability remains in the deferred state or the false positive state using a rule set defined by a user. For example, the rule set may specify that the computing system automatically approves extensions for vulnerabilities with initiated solutions. The initiated solutions can include incomplete solutions that the developers are working on to address the vulnerabilities. Additionally or alternatively, the vulnerability may be suppressed until the solution to address the vulnerability is available. After detecting that the solution is available, the computing system can apply the solution to address the vulnerability. For example, once an additional server is available, the computing system can use the additional server to address the vulnerability associated with the hardware limitation by increasing the available RAM in the computing system.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

Figure 1:
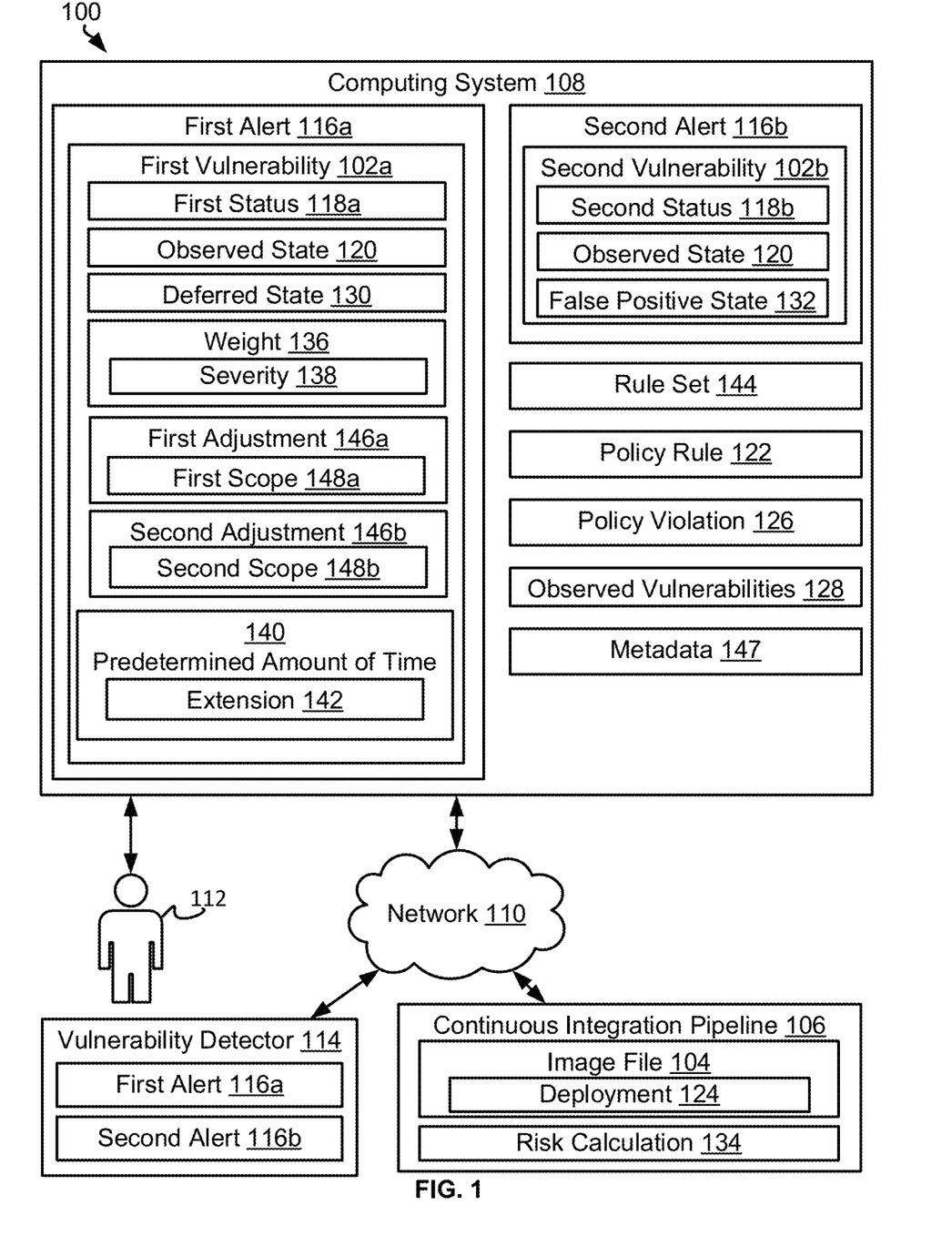
FIG. 1 is a block diagram of an example of a computing environment for suppressing a vulnerability associated with an image file in a CI pipeline according to one example of the present disclosure.

FIG. 1 is a block diagram of an example of a computing environment 100 for suppressing a vulnerability 102 associated with an image file 104 in a continuous integration (CI) pipeline 106 according to one example of the present disclosure. Components within the computing environment 100 may be communicatively coupled via a network 110, such as a local area network (LAN), wide area network (WAN), the Internet, or any combination thereof. For example, the computing environment 100 can include a computing system 108 and the CI pipeline 106 that are communicatively coupled through the network 110. Examples of the computing system 108 can include a desktop computer, laptop computer, server, mobile phone, or tablet. The computing system 108 may be associated with a user 112 (e.g., a developer or a client) that interacts with the CI pipeline 106 through the computing system 108. For example, the user 112 can submit code submissions associated with the image file 104 to the CI pipeline 106.

The computing environment 100 can further include a vulnerability detector 114 that can monitor one or more security databases to detect at least one vulnerability 102 associated with the image file 104 in the CI pipeline 106. In some examples, more than one image file 104 may contain a specific vulnerability. One example of the security databases can include a common vulnerabilities and exposures database. The vulnerability detector 114 may perform this monitoring automatically by interacting with various application programming interfaces (APIs) associated with the security databases.

Upon determining that the vulnerability 102 exists, the vulnerability detector 114 can generate one or more alerts 116. The vulnerability 102 can include a status 118 that is defaulted to an observed state 120, indicating that the vulnerability 102 is accounted for in an evaluation of the image file 104 or the CI pipeline 106. Additionally, the vulnerability 102 being in the observed state 120 may block the CI pipeline 106 from deploying the image file 104 associated with the vulnerability 102. For example, the computing system 108 can apply a policy rule 122 to govern a deployment 124 of the image file 104 by generating a policy violation 126 in response to one or more observed vulnerabilities 128 with the observed state that violate the policy rule 122. As a result, the computing system 108 can block the deployment of the image file 104 associated with the observed vulnerabilities 128 using the policy violation 126.

To deploy the image file 104 in the CI pipeline, the vulnerability 102 can be suppressed. In some examples, the computing system 108 can use the alerts 116 to determine whether a corresponding vulnerability can be suppressed. Alternatively, a requestor, such as the user 112 or other suitable personnel, can submit a request to the computing system 108 to suppress the vulnerability 102. Suppressing the vulnerability 102 can result in adjusting the status 118 of the vulnerability 102 to defer the vulnerability 102 or to mark the vulnerability 102 as false positive.

For example, a first vulnerability 102a can be associated with a first alert 114a transmitted from the vulnerability detector 114 to the computing system 108. The computing system 108 can determine that the first vulnerability 102a is deferrable using the first alert 116a. For example, the computing system 108 can query a database that stores software updates to determine whether a solution is available to address the first vulnerability 102a. If the solution is not available, the computing system 108 can defer the first vulnerability 102a. As another example, the vulnerability detector 114 may tag the first vulnerability 102a with an identifier that indicates whether the first vulnerability 102a is deferrable. A positive status for the identifier can indicate to the computing system 108 to defer the first vulnerability 102a. Accordingly, a first status 118a for the first vulnerability 102a can be adjusted from the observed state 120 to a deferred state 130.

As another example, the vulnerability detector 114 can transmit a second alert 116b associated with a second vulnerability 102b to the computing system 108. The computing system 108 can determine that the second vulnerability 102b is false positive. For example, the computing system 108 may verify that the second vulnerability 102b is false positive by using a vulnerability verifier that can be stored in the computing system 108 or external to the computing system 108 in the computing environment 100. The vulnerability verifier can include specific software that verifies whether the vulnerability 102 is false positive. In response to determining that the second vulnerability 102b is false positive, the computing system 108 can adjust a second status 118b for the second vulnerability 102b from the observed state 120 to a false positive state 132.

After the vulnerability 102 is suppressed, the CI pipeline 106 can deploy the image file 104 associated with the vulnerability 102. Deploying the image file 104 can make the image file 104 available for use by other users or other programs. Additionally or alternatively, suppressing the vulnerability 102 can remove the vulnerability 102 from a risk calculation 134 or other suitable evaluation for the image file 104 or the CI pipeline 106. A weight 136 for the vulnerability 102 can be adjusted to represent a severity 138 of the vulnerability with respect to deploying the image file 104. For example, the vulnerability 102 being likely to have a relatively high security risk can cause the weight 136 to be relatively high. In some examples, the weight 136 can be a multiplier associated with the vulnerability 102 that is accounted for in the risk calculation 134.

In some examples, the vulnerability 102 can be suppressed for a predetermined amount of time 140. For example, the vulnerability 102 may be suppressed for hours, days, weeks, or the like. Upon exceeding the predetermined amount of time 140, the status 118 for the vulnerability 102 can return to the observed state 120. Additionally or alternatively, the vulnerability 102 may be suppressed until the computing system 108 detects that the solution (e.g., a software update) is available to address the vulnerability 102. Once the computing system 108 detects that the solution is available, the status 118 for the vulnerability 102 can be adjusted from the deferred state 130 to the observed state 120. An extension 142 for the predetermined amount of time 140 to suppress the vulnerability 102 can be implemented to continue suppressing the vulnerability 102 after the predetermined amount of time 140 is exceeded. Alternatively, the extension 142 may shorten the predetermined amount of time 140 before the predetermined amount of time 140 is exceeded. The computing system 108 can implement the extension 142 based on a rule set 144 defined by the user 112. In some examples, the requestor can cancel the request for the vulnerability 102, causing the status 118 for the vulnerability to revert to the observed state 120.

An approval process can be implemented by the computing system 108 before adjusting the status 118 of the vulnerability 102. In some examples, an approver (e.g., a security personnel) may approve an adjustment 146 for the status 118 of the vulnerability 102. Additionally or alternatively, the user 112 may function as the approver to self-approve the adjustment 146. Denying the adjustment 146 can cause the status 118 of the vulnerability 102 to remain in the observed state 120. Additionally or alternatively, the computing system 108 may determine the adjustment 146 for the status 118 of the vulnerability 102. In some examples, the computing system 108 can use the risk calculation 134 to determine risk associated with the vulnerability 102. If the vulnerability 102 has a relatively low risk, the computing system 108 may be authorized to approve or deny the adjustment 146.

Each decision in the approval process can be logged with metadata 147. In some examples, the computing system 108 may store the metadata 147 such that an auditor can view the metadata 147 to understand a decision-making process for suppressing the vulnerability 102. The metadata 147 can include text describing reasoning for approving or denying the adjustment 146. In some examples, the reasoning can be inputted by the approver using an input/output device (e.g., a keyboard, a mouse, or a touchscreen) that is communicatively coupled to the computing system 108. Additionally or alternatively, the computing system 108 can automatically generate the reasoning based on one or more rules that are set by the approver or the user 112. For example, the rules can include generating reasoning for a deferred vulnerability that includes which databases were queried to determine that the solution to address the deferred vulnerability is unavailable. In addition to the reasoning, the metadata 147 can include a timestamp associated with the decision in the approval process. The timestamp can provide a time at which the decision was made such that the auditor can follow the decision-making process.

A scope 148 can be associated with the vulnerability to define an extent to which the vulnerability is suppressed. For example, a first adjustment 146a can involve a first scope 148a that is applied to the first vulnerability 102a such that the first vulnerability 102a is suppressed for all image files in the CI pipeline 106. Alternatively, for example, a second adjustment 146b can involve a second scope 148b specifying that the first vulnerability 102a is applied to a specific image file in the CI pipeline 106. In examples in which the first scope 148a is larger than the second scope 148b, the second scope 148b can take precedence such that the second adjustment 146b is applied for the vulnerability 102.

While FIG. 1 depicts a specific arrangement of components, other examples can include more components, fewer components, different components, or a different arrangement of the components shown in FIG. 1. For instance, in other examples, the vulnerability detector 114 may be located inside the computing system 108. Additionally, any component or combination of components depicted in FIG. 1 can be used to implement the process(es) described herein.

Figure 2:
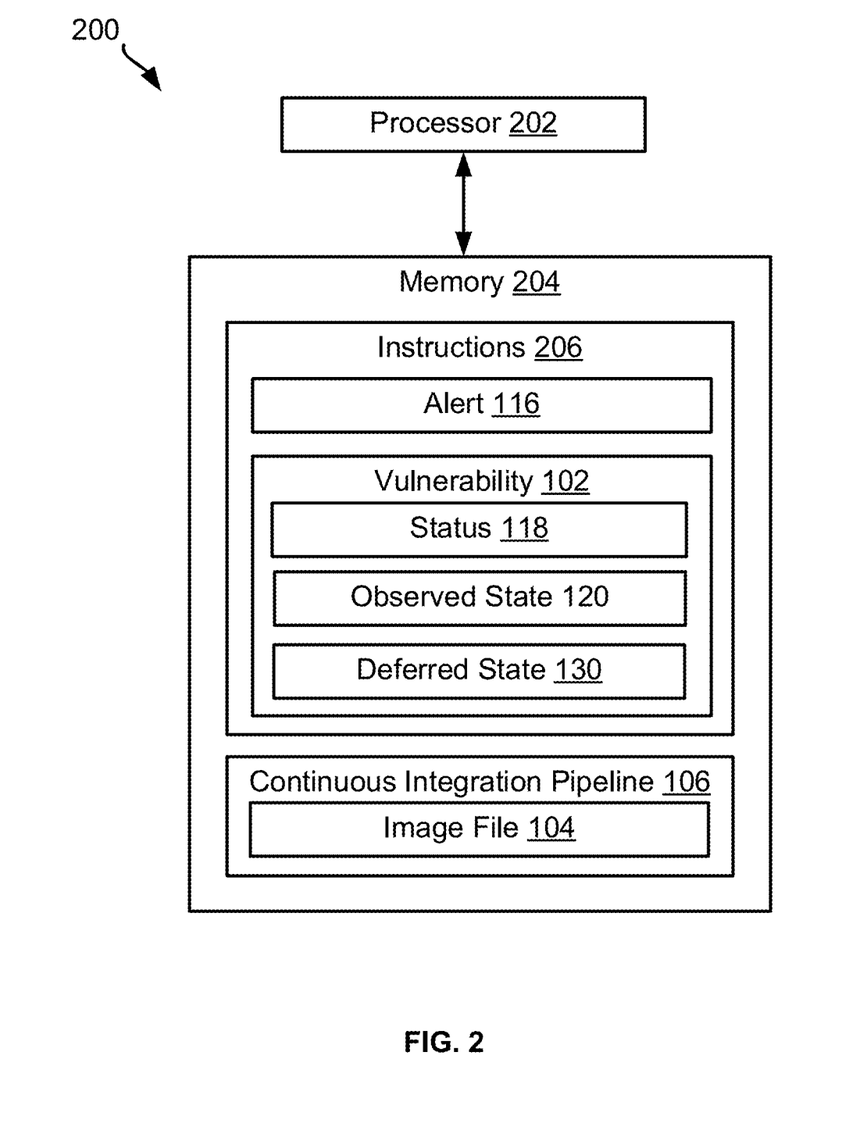
FIG. 2 is a block diagram of another example of a computing environment for suppressing a vulnerability associated with an image file in a CI pipeline according to one example of the present disclosure.

FIG. 2 is a block diagram of another example of a computing environment 200 for suppressing a vulnerability 102 associated with an image file 104 in a continuous integration (CI) pipeline 106 according to one example of the present disclosure. The computing environment 200 can include a processor 202 communicatively coupled to a memory 204.

The processor 202 can include one processor or multiple processors. Non-limiting examples of the processor 202 include a Field-Programmable Gate Array (FPGA), an application-specific integrated circuit (ASIC), and a microprocessor. The processor 202 can execute instructions 206 stored in the memory 204 to perform operations. In some examples, the instructions 206 can include processor-specific instructions generated by a compiler or an interpreter from code written in any suitable computer-programming language, such as C, C++, C #, Java, Python, or any combination of these.

The memory 204 can include one memory device or multiple memory devices. The memory 204 can be non-volatile and may include any type of memory device that retains stored information when powered off. Non-limiting examples of the memory 204 include electrically erasable and programmable read-only memory (EEPROM), flash memory, or any other type of non-volatile memory. At least some of the memory 204 includes a non-transitory computer-readable medium from which the processor 202 can read instructions 206. A computer-readable medium can include electronic, optical, magnetic, or other storage devices capable of providing the processor 202 with the instructions 206 or other program code. Non-limiting examples of a computer-readable medium include magnetic disk(s), memory chip(s), ROM, random-access memory (RAM), an ASIC, a configured processor, and optical storage.

In some examples, the processor 202 can receive an alert 116 associated with the vulnerability 102 from a vulnerability detector (e.g., the vulnerability detector 114 of FIG. 1). After receiving the alert 116, the processor 202 can determine whether the vulnerability 102 can be suppressed. Suppressing the vulnerability 102 can include deferring the vulnerability 102 or marking the vulnerability 102 as false positive. By suppressing the vulnerability 102, the processor 202 can deploy the image file 104 in the CI pipeline 106.

To determine whether the vulnerability 102 can be suppressed, the processor 202 can search the computing environment 200 for a solution that addresses the vulnerability 102. If the processor 202 is unable to detect that the solution is available, the processor 202 can adjust a status 118 for the vulnerability 102 from an observed state 120 to a deferred state 130. The vulnerability 102 being in the deferred state 130 can enable the processor 202 to deploy the image file 104 in the CI pipeline 106.

Figure 3:
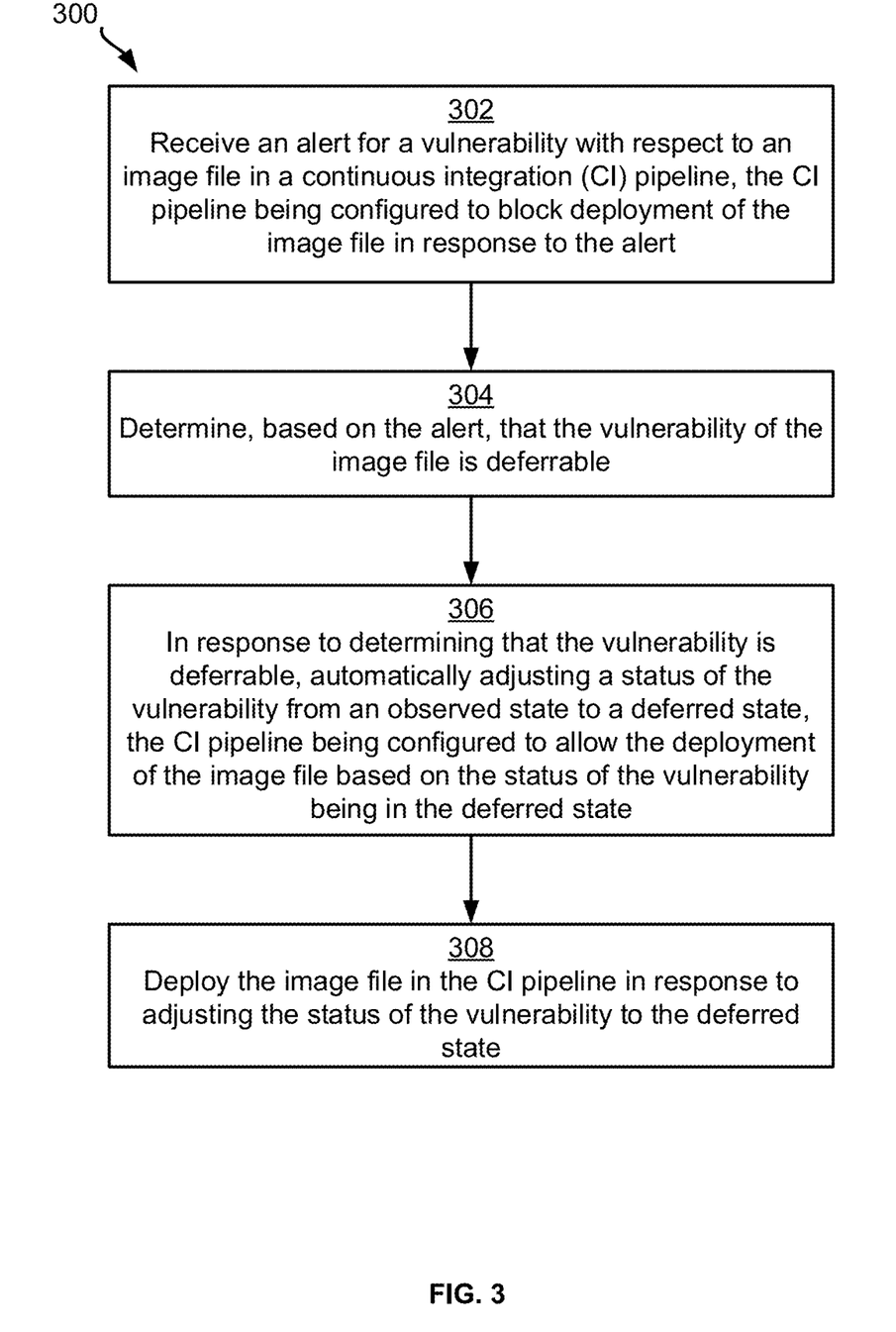
FIG. 3 is a flowchart of a process for suppressing a vulnerability associated with an image file in a CI pipeline according to one example of the present disclosure.

In some examples, the processor 202 can perform one or more of the steps shown in FIG. 3. In other examples, the processor 202 can implement more steps, fewer steps, different steps, or a different order of the steps depicted in FIG. 3. The steps of FIG. 3 are described below with reference to components discussed above in FIGS. 1-2.

At block 302, the processor 202 receives an alert 116 for a vulnerability 102 with respect to an image file 104 in the CI pipeline 106. For example, the vulnerability 102 can involve increased security risk for the image file 104 due to outdated software. The alert 116 can be transmitted by a vulnerability detector (e.g., the vulnerability detector 114 of FIG. 1) to the processor 202. A default state for the vulnerability 102 can be an observed state 120. In some examples, the processor 202 can block deployment 124 of the image file 104 because of the alert 116 being present. Additionally or alternatively, the deployment 124 may be blocked due to the vulnerability 102 being in the observed state 120, causing the vulnerability 102 to violate at least one policy rule 122 set by a user 112. For example, the policy rule 122 can involve preventing image files with outdated software from being deployed. By violating the policy rule 122, the vulnerability 102 can generate a policy violation 126 that causes the processor 202 to block the deployment 124. To enable the deployment 124 of the image file 104, the processor 202 can suppress the vulnerability 102.

At block 304, the processor 202 determines, based on the alert 116, that the vulnerability 102 of the image file 104 is deferrable. For example, the processor 202 can use the alert 116 to determine that a solution to address the vulnerability 102 exists in a computing environment (e.g., the computing environment 100 of FIG. 1). In such examples, the processor 202 can determine that updated software for the image file 104 is available to address the vulnerability 102. In response, the processor 202 can apply the solution to remediate the vulnerability 102 such that security risk of the vulnerability 102 is minimized. Alternatively, the processor 202 can determine using the alert 116 that the solution is currently unavailable, indicating that the vulnerability 102 is deferrable. For example, the processor 202 can use data from the alert 116 to search for the updated software in databases in the computing environment to determine that the updated software is currently unavailable in the databases.

At block 306, in response to determining that the vulnerability 102 is deferrable, the processor 202 automatically adjusts a status 118 of the vulnerability 102 from the observed state 120 to a deferred state 130. By deferring the vulnerability 102, the processor 202 prevents the vulnerability 102 from violating the policy rule 122 that governs the deployment 124 of the image file 104 in the CI pipeline 106. As a result, the CI pipeline 106 can allow the deployment 124 of the image file 104 based on the status 118 of the vulnerability 102 being in the deferred state 130. In some examples, the processor 202 can defer the vulnerability 102 for a predetermined amount of time 140. Additionally or alternatively, the processor 202 may defer the vulnerability 102 until the processor 202 detects that the solution is available.

At block 308, the processor 202 deploys the image file 104 in the CI pipeline 106 in response to adjusting the status 118 of the vulnerability 102 to the deferred state 130. Deploying the image file 104 in the CI pipeline 106 can enable other users or other programs to access the image file 104. For example, other developers may contribute to the updated software for the image file 104 that addresses the vulnerability 102 after the image file 104 is deployed. Deferring the vulnerability 102 additionally can remove the vulnerability 102 from being included in an evaluation associated with the image file 104, the CI pipeline 106, or a combination thereof. For example, a risk report regarding the image file 104 may exclude the vulnerability 102 from calculation after the status 118 of the vulnerability 102 is adjusted to the deferred state 130.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
   a processor; and
   a memory that includes instructions executable by the processor for causing the processor to perform operations including:
   receiving an alert for a vulnerability with respect to an image file in a continuous integration (CI) pipeline, the CI pipeline being configured to block deployment of the image file in response to the alert;
   determining, based on the alert, that the vulnerability of the image file is deferrable;
   in response to determining that the vulnerability is deferrable, automatically adjusting a status of the vulnerability from an observed state to a deferred state, the CI pipeline being configured to allow the deployment of the image file based on the status of the vulnerability being in the deferred state; and
   deploying the image file in the CI pipeline in response to adjusting the status of the vulnerability to the deferred state.

2. The system of claim 1, wherein the operations further comprise:
   adjusting the status for the vulnerability from the observed state to the deferred state for a predetermined amount of time;
   determining that the predetermined amount of time has been exceeded; and
   adjusting the status for the vulnerability from the deferred state to the observed state in response to determining that the predetermined amount of time has been exceeded.

3. The system of claim 2, wherein the operations further comprise:
   determining that the vulnerability remains deferrable in response to determining that the predetermined amount of time has been exceeded;
   receiving an update request from a user, wherein the update request comprises an extension for the predetermined amount of time; and
   automatically approving the extension for the predetermined amount of time based on a rule set defined by the user.

4. The system of claim 1, wherein adjusting the status of the vulnerability from the observed state to the deferred state comprises a first adjustment for a first status of a first vulnerability with respect to a first alert, and wherein the operations further comprise:
   receiving a second alert for a second vulnerability with respect to the image file;

determining that the second vulnerability is falsely detected;

in response to determining that the second vulnerability is falsely detected, automatically adjusting a status of the second vulnerability from the observed state to a false positive state, the CI pipeline being configured to allow the deployment of the image file based on the status of the second vulnerability being in the false positive state; and deploying the image file in response to adjusting the status of the second vulnerability to the false positive state.

5. The system of claim 1, wherein the operations further comprise:

adjusting a weight for the vulnerability based on the status of the vulnerability, wherein the weight for the vulnerability represents a severity of the vulnerability with respect to the deployment of the image file; and determining a risk calculation associated with the deployment of the image file in the CI pipeline based on the adjusted weight of the vulnerability.

6. The system of claim 1, wherein the operations further comprise, prior to adjusting the status for the vulnerability:

applying a policy rule for governing the deployment of the image file in the CI pipeline, wherein a policy violation is generated in response to one or more observed vulnerabilities violating the policy rule; and blocking the deployment of the image file associated with the one or more observed vulnerabilities in response to detecting the policy violation subsequent to receiving the alert for the vulnerability.

7. The system of claim 1, wherein automatically adjusting the status of the vulnerability is a first adjustment that comprises a first scope, and wherein the operations further comprise, subsequent to performing the first adjustment for the status of the vulnerability:

approving a second adjustment for the status of the vulnerability, wherein the second adjustment comprises a second scope that is larger than the first scope; and adjusting the status of the vulnerability according to the first adjustment such that the status of the vulnerability is adjusted from the observed state to the deferred state with respect to the first scope.

8. A method comprising:

receiving an alert for a vulnerability with respect to an image file in a continuous integration (CI) pipeline, the CI pipeline being configured to block deployment of the image file in response to the alert;

determining, based on the alert, that the vulnerability of the image file is deferrable;

in response to determining that the vulnerability is deferrable, automatically adjusting a status of the vulnerability from an observed state to a deferred state, the CI pipeline being configured to allow the deployment of the image file based on the status of the vulnerability being in the deferred state; and deploying the image file in the CI pipeline in response to adjusting the status of the vulnerability to the deferred state.

9. The method of claim 8, further comprising:

adjusting the status for the vulnerability from the observed state to the deferred state for a predetermined amount of time;

determining that the predetermined amount of time has been exceeded; and adjusting the status for the vulnerability from the deferred state to the observed state in response to determining that the predetermined amount of time has been exceeded.

10. The method of claim 9, further comprising:

determining that the vulnerability remains deferrable in response to determining that the predetermined amount of time has been exceeded;

receiving an update request from a user, wherein the update request comprises an extension for the predetermined amount of time; and automatically approving the extension for the predetermined amount of time based on a rule set defined by the user.

11. The method of claim 8, further comprising:

receiving a second alert for a second vulnerability with respect to the image file;

determining that the second vulnerability is falsely detected;

in response to determining that the second vulnerability is falsely detected, automatically adjusting a status of the second vulnerability from the observed state to a false positive state, the CI pipeline being configured to allow the deployment of the image file based on the status of the second vulnerability being in the false positive state; and deploying the image file in response to adjusting the status of the second vulnerability to the false positive state.

12. The method of claim 8, further comprising:

adjusting a weight for the vulnerability based on the status of the vulnerability, wherein the weight for the vulnerability represents a severity of the vulnerability with respect to the deployment of the image file; and determining a risk calculation associated with the deployment of the image file in the CI pipeline to account for the weight of the vulnerability.

13. The method of claim 8, further comprising:

applying a policy rule for governing the deployment of the image file in the CI pipeline, wherein a policy violation is generated in response to one or more observed vulnerabilities violating the policy rule; and blocking the deployment of the image file associated with the one or more observed vulnerabilities in response to detecting the policy violation subsequent to receiving the alert for the vulnerability.

14. The method of claim 8, wherein automatically adjusting the status of the vulnerability is a first adjustment that comprises a first scope, and wherein the method further comprises, subsequent to performing the first adjustment for the status of the vulnerability:

approving a second adjustment for the status of the vulnerability, wherein the second adjustment comprises a second scope that is larger than the first scope; and adjusting the status of the vulnerability according to the first adjustment such that the status of the vulnerability is adjusted from the observed state to the deferred state with respect to the first scope.

15. A non-transitory computer-readable medium comprising instructions that are executable by a processor for causing the processor to perform operations comprising:

receiving an alert for a vulnerability with respect to an image file in a continuous integration (CI) pipeline, the CI pipeline being configured to block deployment of the image file in response to the alert;

determining, based on the alert, that the vulnerability of the image file is deferrable;

in response to determining that the vulnerability is deferrable, automatically adjusting a status of the vulnerability from an observed state to a deferred state, the CI pipeline being configured to allow the deployment of the image file based on the status of the vulnerability being in the deferred state; and deploying the image file in the CI pipeline in response to adjusting the status of the vulnerability to the deferred state.

16. The non-transitory computer-readable medium of claim 15, wherein the operations further comprise:

adjusting the status for the vulnerability from the observed state to the deferred state for a predetermined amount of time;

determining that the predetermined amount of time has been exceeded; and adjusting the status for the vulnerability from the deferred state to the observed state in response to determining that the predetermined amount of time has been exceeded.

17. The non-transitory computer-readable medium of claim 16, wherein the operations further comprise:

determining that the vulnerability remains deferrable in response to determining that the predetermined amount of time has been exceeded;

receiving an update request from a user, wherein the update request comprises an extension for the predetermined amount of time; and automatically approving the extension for the predetermined amount of time based on a rule set defined by the user.

18. The non-transitory computer-readable medium of claim 15, wherein the operations further comprise:

receiving a second alert for a second vulnerability with respect to the image file;

determining that the second vulnerability is falsely detected;

in response to determining that the second vulnerability is falsely detected, automatically adjusting a status of the second vulnerability from the observed state to a false positive state, the CI pipeline being configured to allow the deployment of the image file based on the status of the second vulnerability being in the false positive state; and deploying the image file in response to adjusting the status of the second vulnerability to the false positive state.

19. The non-transitory computer-readable medium of claim 15, wherein the operations further comprise:

adjusting a weight for the vulnerability based on the status of the vulnerability, wherein the weight for the vulnerability represents a severity of the vulnerability with respect to the deployment of the image file; and determining a risk calculation associated with the deployment of the image file in the CI pipeline to account for the weight of the vulnerability.

20. The non-transitory computer-readable medium of claim 15, wherein the operations further comprise:

applying a policy rule for governing the deployment of the image file in the CI pipeline, wherein a policy violation is generated in response to one or more observed vulnerabilities violating the policy rule; and blocking the deployment of the image file associated with the one or more observed vulnerabilities in response to detecting the policy violation subsequent to receiving the alert for the vulnerability.

* * * * *